United States Patent Office 3,700,591
Patented Oct. 24, 1972

3,700,591
CLEANING OF USED MEMBRANE WITH
OXALIC ACID
Willard S. Higley, Glendora, Calif., assignor to the United
States of America as represented by the Secretary of
the Interior
No Drawing. Filed Sept. 24, 1970, Ser. No. 75,246
Int. Cl. B01d 13/00
U.S. Cl. 210—23         7 Claims

ABSTRACT OF THE DISCLOSURE

A method for cleaning and rejuvenating a used reverse osmosis membrane by treating the membrane in situ with a solution of oxalic acid. Not only are deleterious deposits removed from the membrane, but the original osmotic properties of the membrane may be partially restored. The membrane properties may be further improved by a subsequent treatment with a swelling agent or a hot water solution.

BACKGROUND

The desirability of developing economical methods of producing large quantities of fresh water from saline water sources cannot be overemphasized even in this time of unprecedented public concern about our environment. The success of these desalination methods is not only essential to supplement the potable water supply in overcrowded coastal areas, but may also increase agricultural productivity by making feasible the irrigation of vast areas of arid land.

Desalination techniques which have been tested include distillation, ion exchange, reverse osmosis, pressure dialysis, electrodialysis, crystallization and others. One of the most successful of these and potentially the most economical is the technique of desalination by reverse osmosis. Normal osmosis designates the process by which solvent flows through a semipermeable membrane from a dilute to a more concentrated solution. This flow gives rise to a pressure difference across the membrane which pressure is known as the osmotic pressure. The process (i.e. the flow of solvent) can be reversed by applying a pressure greater than osmotic to the more concentrated solution. Thus, in desalination by reverse osmosis a saline solution is brought in contact under pressure with an appropriate membrane, and purified water may be recovered from the opposite side of the membrane.

In improving reverse osmosis techniques for desalination a significant amount of money and effort has been devoted to preparation and development of new membranes. Ideally the most economical reverse osmosis process would be obtained using a membrane which exhibits both high water flux and high salt rejection. Water flux is the measurement of the amount of water which passes through a unit area of the membrane surface during a given time. The salt rejection refers to the ability of the membrane to exclude sodium chloride and is measured by the difference between the salt concentration in the influent and that of the effluent divided by the salt concentration of the influent. To date membranes which fulfill both of these requirements have been developed and utilized in practical reverse osmosis desalination tests.

Despite the success in developing the membranes essential to this process, the cost of reverse osmosis desalination remains relatively high. Much of the cost is attributed to the considerable expense and trouble of replacing membranes whose performance has become unacceptable. For example, it has been found from field operating experience with cellulose acetate membranes that the flux and salt rejection properties decline gradually to uneconomical levels in 6 to 12 months depending on the operating pressure and saline water composition. The cost of the subsequent membrane replacement can amount to as much as 25 to 30 percent of the product water cost.

On stream operation causes gradual degradation of membrane properties for several reasons. First, deposits and precipitates form on the membrane clogging the pores of the membrane and cutting down on the water flux through the membrane. In addition, these solids promote the formation of a stagnant boundary layer which may have a relatively high salt concentration, thereby lowering the effective salt rejection of the membrane and decreasing the purity of the product water. Secondly, the high pressures under which the reverse osmosis desalination systems are operated contribute to the need for membrane regeneration by compressing the membrane causing a further loss of membrane properties. Membrane compaction, as this degenerating process is called, is further accelerated by the solids and precipitates which plug the pores of the membrane and seal these areas of the membrane from the permeation of water. In these areas, the active layer of the membrane is subjected to the full mechanical force of the operating pressure, whereas in the unplugged areas there is a gradual pressure drop throughout the thickness of the active layer due to its permeability to water.

Several approaches have been tried to clean and restore the reverse osmosis membranes, but none with much success. Mechanical cleaning procedures may restore some of the performance, but the technique requires expensive shutdown time for dismantling the unit and eventually membrane replacement is required. Chemical agents have also been tried in the past, but the effects of such treatments have generally been incomplete and the time required for such treatment uneconomically long.

In view of the above considerations, it is an object of the present invention to provide a process for cleaning a reverse osmosis membrane whose performance has declined because of lengthy on stream operation.

It is a further object of this invention to provide a process which performs this cleaning operation in a relatively short period of time to reduce costs associated with lengthy "down time" of the reverse osmosis unit.

Finally, it is an object of this invention to provide a process which not only physically removes the deposits from the membrane but also aids in restoring the original performance of the membrane.

DISCLOSURE

It has now been discovered that these objects may be achieved by contacting the used reverse osmosis membrane with a dilute aqueous solution of oxalic acid.

In this treatment the oxalic acid concentration may range from 0.001 to 5 weight percent, preferably in the range from 0.1 to 1%. The temperature of this cleaning solution may range from 1° to 70° C., preferably in the range near room temperature, and the treatment time may vary from 1 minute to 24 hours or longer depending on the solution temperature and the oxalic acid concentration.

This method of cleaning and rejuvenating a membrane used in reverse osmosis desalination processes takes advantage of the chemical nature of the deposit left on the membrane. A typical sample of such a deposit taken from membranes utilized in desalination of brackish water at Roswell, N. Mex., was analyzed and the results given in Table I:

TABLE I

| Metal | Deposit, percent | Metal | Deposit, percent |
|---|---|---|---|
| Fe | 1.7 | Mn | 0.16 |
| Al | 1.3 | Mo | 0.20 |
| Ni | 0.56 | Cu | 0.05 |
| Cr | 0.74 | Ag | 0.05 |
| Mg | 0.54 | Na | Major |

It must be noted that while this analysis may vary with the locality, most of these elements, particularly iron, will be present to a greater or lesser degree. While not wishing to be restricted to a particular theory of operation, it is believed that the instant invention is so effective because the oxalic acid is a good chelating agent for iron, and the formation of significant quantities of iron complexes aids in removing the other deposits.

The treatment with an aqueous oxalic acid solution may be applied to any reverse osmosis membrane with which the acid does not react. While the present description and examples are directed specifically to cellulose acetate membranes, the invention will be effective with any other membrane composition which meets the above requirement. Even with respect to the cellulose acetate membranes it is not significant that the membrane is either of the symmetric or asymmetric type or whether it is used alone or in composite form with a porous support material. The sole restriction on the applicability of the instant invention to a particular membrane, therefore, is that the membrane does not react with the oxalic acid to the detriment of the performance of the membrane. Indeed, it would be possible to regenerate selective membranes used in other desalination processes such as pressure dialysis or electrodialysis if these membranes are clogged by a similar deposit.

One advantage of the instant invention is that the membrane can be cleaned in situ without the dismantling of the reverse osmosis unit. In practice, the desalination unit which has acquired and undesirable deposit on the membranes with a resulting loss in membrane osmotic properties is shut down and the oxalic acid solution at a suitable concentration and temperature is pumped through the unit at near atmospheric pressure for a sufficient time to remove substantial quantities of mineral deposits thereon and to thereby produce a cleaned membrane of improved performance characteristics. The cleaning solution effluent from the apparatus can be monitored for removal of the deposit. The unit is then flushed out with water and/or feed solution prior to start-up.

Thus, the invention can be utilized to clean and rejuvenate a series of reverse osmosis membranes regardless of the configuration of the apparatus, i.e. tubular, plate, etc. This feature of the invention combined with the fact that the solution works rapidly in removing the deposit, means that any reverse osmosis unit may be cleaned in a extremely short period of time, for example, as short as several hours.

As a further benefit of the invention frequent cleaning by this process may reduce the compaction rate by keeping the membrane free of the compression accelerating deposits. As a result, expensive membrane replacement may be postponed for a considerable time.

The beneficial effects of cleaning the membrane with a dilute oxalic acid solution may further be enhanced by subsequently treating the cleaned membrane with hot water or another swelling agent. While the oxalic acid treatment is extremely effective in removing the deposits from the membrane, its capacity for reswelling the compacted membrane is doubtful. Thus, even though the membranes may be cleaned from time to time by the oxalic acid treatment, reswelling or replacement of the membrane may eventually be necessary to bring the salt rejection and flux of the membranes to economical levels.

In one method of reswelling the membranes, hot water is passed over the membranes in situ at atmospheric pressure. The temperature of the water may be from slightly above room temperature, for example about 30° C., to about 90° C., preferably in the range of from 50° to 75° C. The exact duration of the hot water treatment may vary depending on the construction of the desalination apparatus but generally will range from about 10 minutes to 3 hours, preferably from about ½ to 1½ hours. This treatment causes a partial reswelling of the compacted membrane structure and a partial recovery of the original salt rejection of the membrane. The flux of the membrane may be reduced somewhat because of the enhanced thickness of the membrane, but the overall improvement is economically worthwhile.

It is also contemplated that any other conventional swelling agent known in the art may be used to effect the reswelling of the cleaned membrane. For example, solutions containing membrane swelling agents such as formamide, magnesium perchlorate and zinc chloride could be used in the reswelling treatment.

The invention will be more clearly illustrated by the specific examples which follow, although the invention is not to be limited thereto.

Example 1

As an indication of the relative efficacy of oxalic acid solutions, tests were conducted with used cellulose acetate membranes which were in operation with brackish water feed for thirteen months resulting in the accumulation of a heavy brownish deposit in the membranes. After immersion of this membrane in 1% oxalic acid solution for one hour, almost all of the deposit had been removed.

Similarly, with a 1% solution of RoVer (a solution of approximately 60% sodium bisulfite and 40% sodium hydrosulfite manufactured by the Hach Chemical Co., Ames, Iowa, and described in U.S. Pat. No. 3,183,191) the removal action was somewhat slower, but was complete within twenty-four hours. A solution of 1% citric acid was also tried, but a twenty-four hour cleaning period and a water wash were required in order to remove all visible deposits. Solutions of 1% ethylenediaminetetracetic acid, tetrasodium salt (EDTA) and 1% hydrogen peroxide were also tried but demonstrated no visible removal of deposit from the membranes after a twenty-four hour treatment period.

The oxalic acid solution, therefore, was faster in removing these deposits than solution of the same concentration of the other reagents.

Example 2

To determine the ability of oxalic acid to remove iron deposits from a reverse osmosis membrane, the following experiment was conducted. A standard cellulose acetate reverse osmosis membrane was utilized at 800 p.s.i. on a 5000 p.p.m. sodium chloride feed solution. The initial properties of the membrane comprised a salt rejection of 88.5% and a water flux of 24.2 g.f.d. (gallons/foot/day). Ferrous sulfate was added to the feed solution at a concentration of 50 p.p.m. and desalination was continued with air bubbling through the feed solution to oxidize the ferrous sulfate to the hydrous oxide. After about one hour the flux had declined to 21.4 g.f.d., although the salt rejection remained constant. After 21 more hours of operation the flux had further decreased to 20.9 g.f.d., but the salt rejection continued to remain the same. The membrane, which visually showed a moderate deposit, was analyzed and found to contain 0.072 weight percent iron.

Three-inch circles were cut from the membranes and treated by immersing four of them in each of two different solutions for twenty-four hours. The cleaning solutions used were 1% citric acid, and 1% oxalic acid.

The membranes treated with oxalic acid solution showed a dramatic visual removal of deposit after only one hour of treatment. The other membranes treated in citric acid showed visible deposits even at the end of the treatment, although some of this remaining deposit could be removed with a water rinse.

After all the membrane samples were water rinsed and dried, an analysis was made and the efficacy of the cleaning solutions determined.

Treatment:     Iron deposit removed (1%), percent
- 1% citric acid _____ 82
- 1% oxalic acid _____ 93

Example 3

Conventional cellulose acetate membranes were utilized in a reverse osmosis desalination operation identical to that in Example 2. Membrane samples cut from these fouled membranes were then treated with solutions of 0.5% oxalic acid, 0.5% sodium hydrosulfite and 0.5% RoVer (a solution of approximately 60% sodium bisulfite and 40% sodium hydrosulfite manufactured by the Hach Chemical Co., Ames, Iowa, and described in U.S. Pat. 3,183,191). Samples treated with each of these solutions showed a visible removal of the iron deposit from the membrane.

The cleaned membrane samples were utilized in a desalination system at 800 p.s.i. and 5000 p.p.m. sodium chloride solution to determine their osmotic properties. The membranes were compared to control membranes which represented the untreated and fouled membrane. The results of these tests of the cleaned membranes are given in the following table:

TABLE II

| Treatment | Treated membrane | | Control | |
|---|---|---|---|---|
| | Flux, g.f.d. | Salt rejection, percent | Flux, g.f.d. | Salt rejection, percent |
| 0.5% RoVer | 18.3 | 85.2 | 15.5 | 86.6 |
| 0.5% oxalic acid | 20.5 | 86.7 | 18.5 | 86.4 |
| 0.5% sodium hydrosulfite | 19.1 | 85.3 | 18.5 | 85.7 |

It can be seen that membranes treated with oxalic acid exhibited the best overall improvement in both salt rejection and water flux.

Example 4

This experiment was performed to demonstrate the capability of the oxalic acid cleaning technique for improving used membranes under practical in situ regeneration conditions. The used membranes were evaluated in a test cell at 800 p.s.i. and 5000 p.p.m. sodium chloride feed solution to determine their individual osmotic properties.

After this initial evaluation the membranes were treated with an aqueous 0.5% oxalic acid solution at near atmospheric pressure by allowing the solution to flow serially over the membranes in the unit from a three foot high reservoir. The effluent from this treatment was reddish brown in color. The treatment which lasted about three hours was controlled by means of a valve in the exit line from the third cell. After this cleaning treatment the membranes were washed with water using the same reservoir. The membranes were again tested at 800 p.s.i. and 5000 p.p.m. sodium chloride feed solution. The results given in Table III show an increase in both flux and salt retention in each case, which can be attributed primarily to the removal of the deposit and the consequent improved boundary layer conditions.

To reswell the membrane and increase the salt rejection, the membranes were subject to a mild hot water treatment. This heat treatment was performed by recycling hot water through the cells in series from a thermostatically controlled hot water bath. The water was circulated at a sufficiently fast rate to avoid significant heat losses from non-insulated portions of the apparatus. The temperature of the hot water was maintained at about 48° to 52° C. The membranes were then tested at the conditions previously used and the results are reported in Table III.

TABLE III

| Used membrane | | Cleaned membrane | | Heat-treated membrane | |
|---|---|---|---|---|---|
| Flux, g.f.d. | Salt rejection, percent | Flux, g.f.d. | Salt rejection, percent | Flux, g.f.d. | Salt rejection, percent |
| 21.5 | 58.2 | 25.1 | 70.5 | 23.5 | 76.9 |
| 14.3 | 74.1 | 16.5 | 76.4 | 16.4 | 79.3 |
| 19.2 | 65.5 | 24.6 | 69.5 | 23.3 | 77.0 |

As can be seen from the above data, the final heat treatment did cause a slight loss in the flux of the membranes. However, the salt rejections were improved.

The cumulative effect of the cleaning and heat-treatment did cause a slight loss in the flux of the membranes, and salt rejection improvement ranging from 7 to 32%.

Example 5

A second test of cleaning and rejuvenation of used membranes was conducted as in the previous example. One membrane, however, developed a leak during the initial evaluation of the membranes and was capped off.

The remaining two membranes were treated with an aqueous solution of 0.5% oxalic acid.

The heat-treating step, however, could not be conducted because of inadequate flow of hot water through the unit. The low flow was thought to be associated with the thicker, porous stainless steel support plates which had been substituted for the fiberglass-resin plates of the previous example. In separate tests the latter support material demonstrated adequate flow.

The results of the oxalic acid cleaning are given as follows:

| Used membrane | | Cleaned membrane | |
|---|---|---|---|
| Flux, g.f.d. | Salt rejection, percent | Flux, g.f.d. | Salt rejection, percent |
| 20.8 | 67.9 | 25.0 | 73.8 |
| 18.1 | 64.0 | 22.3 | 70.7 |

I claim:
1. A process for the cleaning of a reverse osmosis membrane whose performance has become impaired by on-stream operation in the desalination of saline water which comprises:
treating said membrane with an aqueous solution of from 0.0001 to 5 weight percent oxalic acid at a temperature from 1 to 70° C. for a sufficient time to remove substantial quantities of mineral deposits thereon and to thereby produce a cleaned membrane of improved performance characteristics.
2. The process of claim 1 wherein said aqueous solution contains 0.1 to 1.0 weight percent oxalic acid.
3. The process of claim 1 wherein said cleaned membrane is further improved by treatment with a swelling agent for a sufficient time to reswell the membrane.
4. The process of claim 3 wherein said swelling agent is water at a temperature of within the range of about 30 to 90° C.
5. The process of claim 3 wherein said swelling agent is water at a temperature of within the range of about 50 to 75° C.
6. The process of claim 1 wherein said temperature is room temperature.
7. The process of claim 1 in which said treating step is performed in situ of the reverse osmosis unit.

References Cited
UNITED STATES PATENTS

| 1,421,341 | 6/1922 | Zsigmondy et al. | 210—321 X |
| 3,536,612 | 10/1970 | Kopecek et al. | 210—23 |

(Other references on following page)

FOREIGN PATENTS 172,012  2/1923  Great Britain _____ 210—500

OTHER REFERENCES

"Reverse Osmosis Membrane Regeneration," Office of Saline Water, R & D Report #471, received Patent Office Oct. 9, 1969; 80 pages, pages 1, 2, 34–37, 54–59 relied on.

Office of Saline Water, R & D Report #430, received Patent Office July 18, 1969; 63 pages, pp. 15–27 relied on.

Webster's Seventh New Collegiate Dictionary, 1965, 1221 pages, p. 603 relied on.

1968 Saline Water Conversion Report, published June 5, 1969, 489 pages, for sale by Sup't of Documents, pp. 374–378 relied on.

FRANK A. SPEAR, JR., Primary Examiner

U.S. Cl. X.R.

210—79, 321, 433